Dec. 16, 1958     W. M. HOULDSWORTH     2,864,323
PIE-MOLE
Filed Aug. 26, 1952
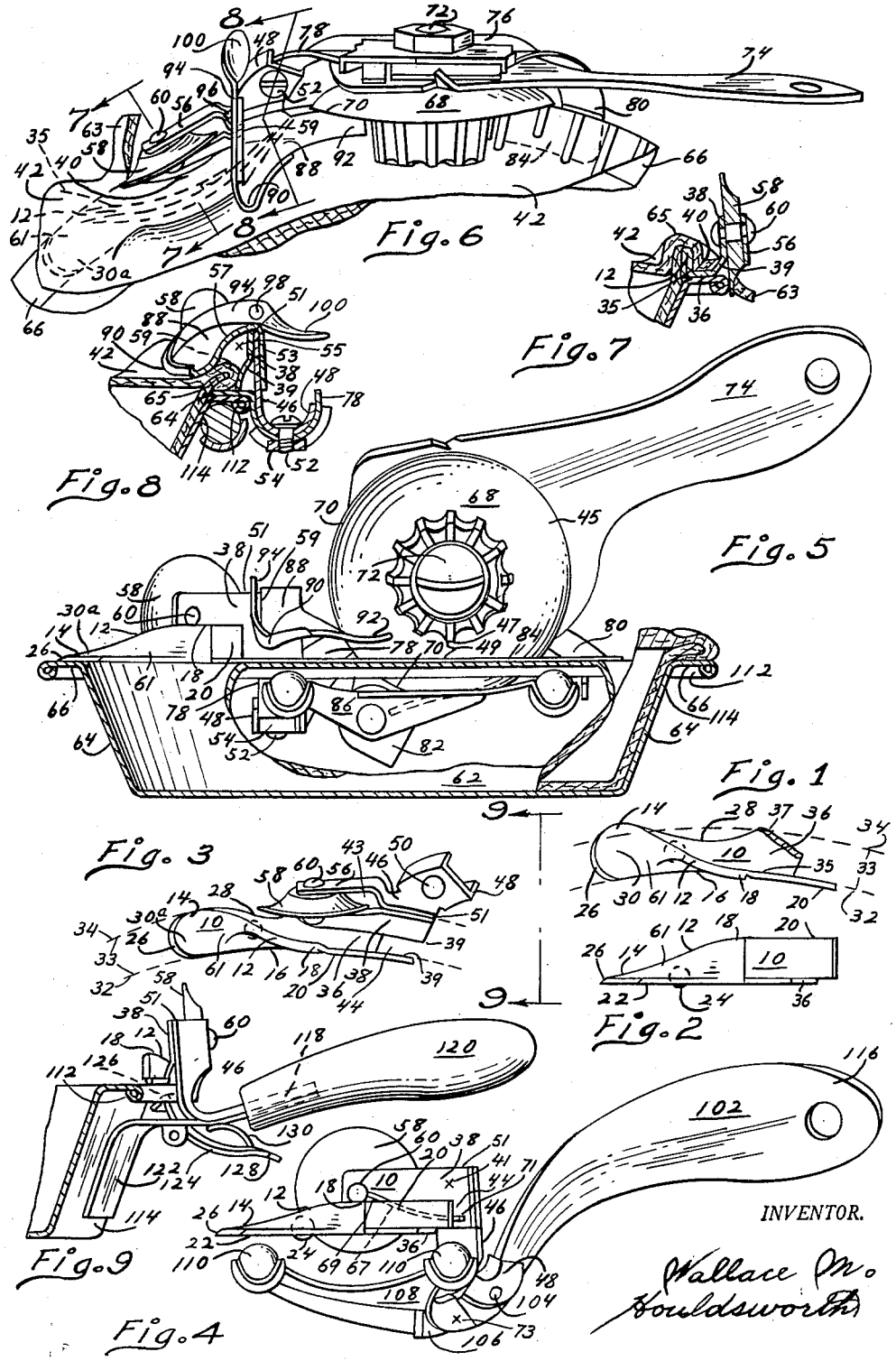
INVENTOR.
Wallace M. Houldsworth United States Patent Office 2,864,323
Patented Dec. 16, 1958

2,864,323

PIE-MOLE

Wallace M. Houldsworth, Royal Oak, Mich.

Application August 26, 1952, Serial No. 306,437

16 Claims. (Cl. 107—49)

This invention relates to utensils used for making pies and the like and is adapted for use in advance of a pie crimping utensil, or in advance of the crimping operation.

An important object of this invention is to provide means that can be permanently secured to improved pie utensils, or made to be detachable therefrom for optional use therewith, adapted to be propelled around the pie pan while bearing upon the rim of a pie pan, and while so doing to lift the crust material overlying and projecting beyond the pan rim, thus drawing the overhanging crust material back over the rim and sever the excess crust therefrom while forming a folded formation to a desired height in a simultaneous operation in advance of the crimping.

An important object of this invention is to provide a pie crust lifting, trimming and folding device, or mole-point with means for attaching same to the under-carriage of the pie trimming utensil disclosed in my copending United States application for a patent Serial No. 306,436 filed Aug. 26, 1952.

Another important object is that this invention may be provided with cutting means for trimming excess crust material projecting therefrom.

Another object is that it provides means of making a pie having a single bottom crust with a two thickness edge or a pie having both bottom and top crusts with either a three or four thickness edge.

A further important object of this invention is to provide a device which can, at the manufacturer's option, be used to form the crust into a vertical formation to a height higher than the width of the pie pan rim.

Another important object of this invention is that after raising the crust to a multi-layer vertical position, it can be made to return said crust to a horizontal turned under formation.

All of the foregoing and still further objects and advantages of the invention will become more fully apparent from a study of the specification, taken in connection with the drawings wherein:

Fig. 1 is a top view of the mole point, the broken lines indicate the edges of the pie pan rim, and the cross sectioned portion indicates that it may be a continuation of the utensil with which it is to be used.

Fig. 2 is an elevational view of the mole point showing the pie-side, that is, the side that faces the center of the pie during use.

Fig. 3 is a top view showing a modified form.

Fig. 4 is a perspective view of the pie-side of Fig. 3 and showing an under-carriage and handle pivotly thereto.

Fig. 5 is a pie-side view showing a modification of the mole point shown in Fig. 3, showing it attached to a crimping utensil and positioned on a section of a pie pan, showing a portion of the pan wall cut away for clarity.

Fig. 6 is a top view of Fig. 5 but showing crust material covering the pan, and in the act of being raised and trimmed.

Fig. 7 is a cross-sectional view taken on lines 7—7 of Fig. 6 but drawn in vertical position.

Fig. 8 is a cross-sectional view taken on lines 8—8 of Fig. 6 but drawn in vertical position similar to Fig. 7.

Fig. 9 is a perspective right hand end view of Fig. 3 but drawn in vertical position, having a handle and undercarriage added and the utensil positioned on a portion of a pan rim.

Referring to the drawings and particularly to Figs. 1 and 2, the embodiment of the invention illustrated therein, includes a member 10 having a contoured ridge 12 starting at 14 or the forward outside edge, and rising to a desired height at crown 18 as it curves cross-wise to the curved inside edge 16 where it may terminate in an extended supporting ridge 20. The member 10 has a generally flat lower face 22 to slide on the top of the pan rim on which it is to be operated, and if preferred it may have one or more inserted balls 24 or rollers to relieve friction. The forward edge 26 should be beveled to slide beneath the crust material overlying the pan rim. The outer edge of member 10 may be relieved at 28 to allow the cutter used for severing the excess crust to contact the outer edge of the pan rim, when projecting beyond said edge of the pan rim. The cutting edge should contact the outer edge of the pan rim opposite the intermediate portion on the top of the ridge 12 where the distances down the side of said ridge 12 and over to the edge of the pan rim are approximately the same, so that the crust material if projecting beyond the pan rim will be severed therefrom, while the crust material overlying the ridge would continue to rise to the crown 18, so as to drape said crust over the ridge 12 in a multi-folded formation.

The height that the crust is to be raised is determined by the width of the forward point 30, and the height of the crown 18 of the member should be approximately the same. The width of the point 30a shown in Figs. 3 and 6, is approximately the width of the pan rim 66. The space 33 between the broken lines 32 and 34 indicate the top of the pan rim, as shown in Fig 1. The point 30 projects beyond the outer line 34, which represents the outer edge of the pan rim. As the ridge 12 starts to incline upward at 14, the crust material must also start to rise, and the point 30 and ridge 12 slides beneath the crust, a multi-layer vertical crust ridge is formed, however if said crust is to be relaid in a horizontal turned under formation the height of said vertical crust ridge should not be greater than the width of the pan rim, as shown in Figs. 5 and 6. The portion 36 is formed at approximately 90° to the lower edge of the rearward side 35 of the ridge, as shown in Figs. 1, 3 and 7, the cross-hatched edge 37 indicates that the member can be formed in any way necessary for it to be a continuation of a utensil carrying its own cutting edge (which is described later) for use when it is necessary to sever the excess crust material if it projects beyond the pan rim on which it is to be operated.

Figs. 3 and 4 show portion 36 modified by providing it with a flange or upright portion 38 lying in spaced relation to the ridges 12 and 20 so as to form the slot 44. Portion 38 may be formed at its bottom shown at 39 so that it urges the trimmed crust edge 40 of crust 42 inwardly, as shown by Figs. 6 and 7. This is to urge the vertically folded crust formation fairly close together before the ridge is moved therefrom.

A lateral portion forming a bracket element 46 is shown in Figs. 3, 4, 6, 8 and 9 secured to the upper rear surface of the portion 38, an X numbered 41 indicates where they are spot welded together as shown in Figs. 4 and 8. The bracket element 46 is shown having a lower portion 48 formed to locate the member to an arm 78 of the utensil with which it is to be used, shown best in Fig. 8. Although they can be secured together several different ways, said portion 48 shown in Fig. 3 has an aperture 50, and in Figs. 6 and 8, a screw 52 is shown positioned in said aperture, while in Figs. 5 and 8, a nut 54 is shown securing the two utensils together. The lower portion 48 can be formed in any way necessary to enable it to be used either in conjunction with a pie trimmer, as shown in Figs. 4, 5, 6 and 8, or with a handle, as shown in Fig. 9. The element 46 also has a forward portion 56 formed to project in parallel spaced relation to the portion 38 so as to form a fork 43 wherein a trimming wheel 58 is journalled on a shaft or pin 60.

Two models of the Pie-Mole have been described, one to be used with a crimping utensil that carries a cutter to sever the excess crust when necessary, the other a modified form carrying its own cutter, for vertically positioning said crust in a multi-layer formation; either can be a permanent part of the utensil, or detachable therefrom providing optional use thereof.

In Figs. 5 and 6 the Pie-Mole is shown attached to the pie trimming and crimping utensil disclosed and described in my co-pending application for United States Patent Serial No. 306,439 filed August 26, 1952. In this instance, the Pie-Mole shows an additional element for use with the said utensil, namely, a crust return guide 88 made of thin resilient material formed in an inverted arcuate formation which projects inwardly and downwardly from the top edges 51 of the bracket 46 and portion 38, and has a flanged portion 53 formed to secure said guide to the bracket by spot welding as shown at 55 of Fig. 8.

Guide 88 also has a flanged point 90 which is suspended at a desired distance inwardly and below the top of the crown 18. The cross-hatched edge 57 in Fig. 8, taken on lines 8—8 of Fig. 6, shows the inverted arcuate formation of the guide 88, said formation becomes larger as it curves forwardly to the front edge 59, and smaller as it curves rearwardly terminating in a curved suspended spring 92 having vertical movement, said spring formed to project rearwardly and horizontally in spaced relation from the tangential plane of the bottom surface 22 of the member 10. As the Pie-Mole slidably bears on the pan rim, obviously the point and ridge must slide beneath the crust material overlying said rim, therefore as previously stated the contoured ridge 12 starts at the forward outside edge 14, and is formed to incline upward to a desired height approximately equal to the width of the point as it extends crosswise (opposite to the direction of its travel) to the curved inside edge 16 of said member. Thus as the Pie-Mole is advanced on a pan rim, the point sliding beneath the crust material causes said crust overlying said rim to slide up the forward side 61 of the ridge 12, while the crust hanging beyond the edge of said rim will be raised while projecting from the rearward side of said ridge 12, and the excess crust 63 is then severed therefrom as it comes in contact with the cutter 58, as shown in Figs. 6 and 7. The crust overlying the ridge continues to rise until it reaches the summit of the ridge while the severed edge 40 of said crust enters the slot, as shown in Fig. 7, and said crust edge 40 is urged inwardly while the ridge 12 slides from beneath the vertically raised crust, thereby forming a multi-layer vertical crust edge 65 as shown in Figs. 6, 7 and 8.

To re-lay the multi-layer vertical crust edge in a horizontal turned under formation on the pan rim, the device must be equipped with the crust guide 88 (said crust guide can be used with all modifications). In the process just described, said guide passes over the vertical crust edge 65, and in doing so said crust edge contacts the contoured surface of the guide, urging the top of the crust edge 65 outwardly until it passes beneath the spring 92, completing the re-laying operation. In Fig. 8, the crust edge 65 is shown in the act of being re-laid horizontally.

The portion 38 can be formed to guide the severed crust edge 40 inwardly as previously stated, but it may be preferred to use a separate spring 67. As shown in Fig. 4, the forward end 69 is formed to secure it adjacent to the portion 38, when riveting over the end of the shaft 60, while the rear free end 71 projects rearwardly within the slot 44, thus providing a light inward thrust against the severed crust edge 40 as it passes therethrough.

A spring made from round wire is shown in Fig. 4 for clarity, but a flat spring can be used.

If preferred a lever 94 with a finger 100 may be formed integral with flange 90, by extending one end of the flange so that it projects along, but free of, the forward edge 59 of the guide 88 and outwardly over but so as to rest on the top edges 51 of the portion 38 and the bracket element 46 as shown in Figs. 5, 6 and 8. A pin 96 is shown in Fig. 6 projecting rearwardly from the bracket element 46 so arranged that it will catch in an aperture 98 of the lever 94, as shown in Fig. 8, when the outer end 100 of the lever 94, is pressed downwardly and forwardly, thereby raising and securing point 90 to a position where it is clear of the folds of the crust until raised into a vertical formation, for use only during initial mounting of the Pie-Mole.

The Pie-Mole is not limited to either a permanent or detachable connection with the pie utensils described above but may also be operated independently thereof, by attaching thereto a handle 102 as shown in Fig. 4. The attachment is accomplished by passing a pivot pin 104 through the U-shaped bracket or socket 48 which permits a limited or slight pivotal movement between the handle and the socket.

The lower end of the handle 106 carries spot-welded thereto at 73 an undercarriage 108 having mounted thereon in sockets at spaced points, a pair of ball bearings 110, arranged for contact with the underside 66 of the pie pan rim, inside of the rolled under edge 112, for guiding the Pie-Mole around the rim of the pan. By means of pivot 104, downward pressure of handle 102 raises the ball bearings 110 into contact with the rim portion 66.

A simpler modification of the above utensil having a handle with undercarriage is shown in Fig. 9, where the lower portion 48 (shown in Figs. 3, 4, 5, 6 and 8) of the bracket element 46 is formed in the shape of a prong 118 projecting outwardly to support a wooden or plastic handle 120. At least one portion 122 is formed to project inwardly beneath the pan rim, and downwardly to slidably contact the pan wall 114. The portion 122 is formed to pivotally support a small lever 124 the upper end 126 of which catches inside the rolled edge 112 of the rim, and the outer end 128 of which has a resilient finger 130 formed to contact the lower surface of the portion 118, thus urging the outer end 128 of the lever 124 away from the portion 118 to hold the upper end 126 in contact with the rolled edge 112 of the rim when the utensil is positioned on said rim. The portion 122 and the upper end 126 of the lever may have rotatable balls secured within sockets to eliminate friction when contacting the pan.

In general, there is provided as a result of this invention a culinary utensil capable of either simultaneously upturning and raising, or simultaneously upturning, raising and severing the crust material in its path thereby producing a multi-layer vertical edge, while a modification provides means of re-laying said crust in a multi-layer horizontal turned under formation.

What I claim is:

1. A culinary utensil for the purposes described, an elongated member having a rounded beveled end portion, constituting a front end portion, the member having a flat bottom surface and a contoured top surface, the forward portion of the member being flat, a ridge inclining upwardly from the flat portion, said ridge starting at one side of the member constituting the outer side and terminating at the opposite end and side of the member.

2. A culinary utensil for the purposes described, an elongated member having a generally flattened and rounded forward portion, constituting a forward end portion, the member having a generally flat bottom surface and a contoured top surface, a ridge starting at one side of the member constituting the outer side of said member, the ridge inclining upwardly, rearwardly and terminating along the opposite side of the member.

3. A culinary utensil for the purposes described, an elongated member having a rounded beveled end portion, constituting a front end portion, the member having a flat bottom surface and a contoured top surface, the forward portion of the member being flat, a ridge inclining upwardly from the flat portion, said ridge starting at one side of the member constituting the outer side and terminating at the opposite end and side of the member, and the outer side of said member having a lateral portion formed thereon for attachment of means for propelling said member.

4. A culinary utensil for the purposes described, an elongated member having a rounded beveled end portion, constituting a front end portion, the member having a flat bottom surface and a contoured top surface, the forward portion of the member being flat, a ridge inclining upwardly from the flat portion, said ridge starting at one side of the member constituting the outer side and terminating at the opposite end and side of the member in a desired height at its summit with vertical lower sidewalls adjacent said summit, and the outer side of said member having a lateral portion formed thereon for attachment of means for propelling said member.

5. The combination, as previously claimed in claim 4 characterized in that the outer side of the member has an upright portion with the lateral portion secured outwardly thereto, and a resilient guide suspended inwardly from the upright portion, the guide having an arcuate formation and terminating rearwardly in a vertically movable spring, with the spring suspended in spaced relation above the tangential plane of the bottom of the member.

6. The combination, as previously claimed in claim 4 characterized in that the rearward portion of the outer side of the member has an upright portion with the lateral portion secured thereto, and a wheel forming a diametrical cutter positioned by a pivot to the upright portion midway of the outer side.

7. The combination, as previously claimed in claim 4 characterized in that the rearward portion of the outer side of the member has an upright portion with the lateral portion secured thereto, a wheel forming a diametrical cutter positioned by a pivot to the upright portion midway of the outer side, and a resilient guide positioned rearward of the wheel and suspended inwardly from the upright portion, the guide having an arcuate formation and terminating rearwardly in a vertically movable spring suspended in spaced relation above the tangential plane of the bottom of the member.

8. A culinary utensil for the purposes described, an elongated member having a generally flattened and rounded end portion, constituting a forward end portion, the member having a generally flat bottom surface and a contoured top surface, a ridge starting at one side of the forward end portion constituting the outer side of said member, the ridge inclining upwardly, rearwardly and terminating along the opposite side of the member, vertically disposed flange guide means in spaced flanking relation to the rearward portion of said ridge along the rearward outer side of the member, to form a channel with said ridge and the rearward portion, the outer side having a lateral portion formed for attachment of means for propelling and alignment of said member.

9. The combination, as previously claimed in claim 8 characterized in that the outer side of the member has an upright portion with the lateral portion secured outwardly thereto, and a resilient guide suspended inwardly from the upright portion, the guide having an arcuate formation and terminating rearwardly in a vertically movable spring, with the spring suspended in spaced relation above the tangential plane of the bottom of the member.

10. The combination, as previously claimed in claim 8 characterized in that the rearward portion of the outer side of the member has an upright portion with the lateral portion secured thereto, and a wheel forming a diametrical cutter positioned by a pivot to the upright portion midway of the outer side providing means to sever the excess crust material.

11. The combination, as previously claimed in claim 8 characterized in that the rearward portion of the outer side of the member has an upright portion with the lateral portion secured thereto, a wheel forming a diametrical cutter positioned by a pivot to the upright portion midway of the outer side providing means to sever the excess crust material, and a resilient guide positioned rearward of the wheel and suspended inwardly from the upright portion, the guide having an arcuate formation and terminating rearwardly in a vertically movable spring, with the spring suspended in spaced relation above the tangential plane of the bottom of the member.

12. The culinary utensil for the purposes described, an elongated member having a generally flattened and rounded front end portion, the member having a generally flat bottom surface and a contoured top surface, a ridge generally starting at one side of the member constituting the outer side of said member, the ridge inclining rearwardly and being vertically disposed, flange guide means mounted in spaced flanking relation to the rearward outer side of said member to form a channel with said ridge.

13. The culinary utensil for the purposes described, an elongated member having a generally flattened and rounded front end portion, the member having a generally flat bottom surface and a contoured top surface, a ridge generally starting at one side of the member constituting the outer side of said member, the ridge inclining rearwardly and being vertically disposed, flange guide means mounted in spaced flanking relation to the rearward outer side of said member, to form a channel with the ridge and the rearward portion of the outer side which has a lateral portion formed for attachment of means for propelling and alignment of said member.

14. The combination, as previously claimed in claim 13 characterized in that the outer side of the member has an upright portion with the lateral portion secured outwardly thereto, and a resilient guide positioned rearwardly of the ridge and suspended inwardly from the upright portion, said guide having an arcuate formation.

15. The combination, as previously claimed in claim 13 characterized in that the outer side of the member has an upright portion with the lateral portion secured outwardly thereto, and means carried by the upright portion and positioned midway of the outer side for severing the excess crust material therefrom.

16. The combination, as previously claimed in claim 13 characterized in that the outer side of the member has an upright portion with the lateral portion secured outwardly thereto, means carried by the upright portion and positioned midway of the outer side for severing the excess crust material therefrom, and a resilient guide positioned rearward of the severing means and suspended inwardly from the upright portion, said guide having an arcuate formation.

References Cited in the file of this patent

UNITED STATES PATENTS

| | | |
|---|---|---|
| 30,592 | Shaw | Nov. 6, 1860 |
| 88,726 | Matthes | Apr. 6, 1869 |
| 260,369 | Camp | July 4, 1882 |
| 524,400 | Tinman | Aug. 14, 1894 |
| 727,269 | Berkstresser | May 5, 1903 |
| 860,641 | Croxford | July 23, 1907 |
| 1,044,253 | Sampley | Nov. 12, 1912 |
| 1,182,755 | Cowen | May 9, 1916 |
| 1,240,427 | Dougherty | Sept. 18, 1917 |
| 2,546,287 | Zelgert | Mar. 27, 1951 |
| 2,595,344 | Egerton et al. | May 6, 1952 |